United States Patent
Minehan (10) Patent No.: US 11,068,292 B2
(45) Date of Patent: Jul. 20, 2021

(54) COMPUTING SYSTEM TRANSLATION TO PROMOTE EFFICIENCY

(71) Applicant: CORE SCIENTIFIC, INC., Bellevue, WA (US)

(72) Inventor: Kristy-Leigh Anne Minehan, Bellevue, WA (US)

(73) Assignee: Core Scientific, Inc.

( * ) Notice: Subject to any disclaimer, the term of this patent is extended or adjusted under 35 U.S.C. 154(b) by 109 days.

(21) Appl. No.: 16/589,100

(22) Filed: Sep. 30, 2019

(65) Prior Publication Data

US 2021/0064399 A1 Mar. 4, 2021

Related U.S. Application Data (63) Continuation of application No. 16/587,860, filed on Sep. 30, 2019.
(60) Provisional application No. 62/892,029, filed on Aug. 27, 2019.

(51) Int. Cl.
| | | |
|---|---|---|
| *G06F 9/455* | (2018.01) | |
| *G06F 9/48* | (2006.01) | |
| *G06F 9/445* | (2018.01) | |
| *G06Q 20/36* | (2012.01) | |
| *G06F 9/52* | (2006.01) | |
| *G06Q 20/06* | (2012.01) | |
| *G06Q 20/38* | (2012.01) | |
| *G06F 9/30* | (2018.01) | |

(52) U.S. Cl.
CPC ........ *G06F 9/4552* (2013.01); *G06F 9/30083* (2013.01); *G06F 9/44505* (2013.01); *G06F 9/4893* (2013.01); *G06F 9/524* (2013.01); *G06Q 20/0658* (2013.01); *G06Q 20/3678* (2013.01); *G06Q 20/381* (2013.01)

(58) Field of Classification Search
None
See application file for complete search history.

(56) References Cited

U.S. PATENT DOCUMENTS

| | | | | |
|---|---|---|---|---|
| 2009/0135751 A1* | 5/2009 | Hodges | ................ | G06F 1/3209 370/311 |
| 2010/0058087 A1* | 3/2010 | Borras | ................ | G06F 1/3275 713/322 |
| 2010/0280676 A1* | 11/2010 | Pabon | .................... | G06F 1/266 700/295 |
| 2012/0003932 A1* | 1/2012 | Zhodzishsky | ..... | H04W 52/0229 455/41.2 |

(Continued)

OTHER PUBLICATIONS

"Understanding ProgPoW," <https://medium.com/@ifdefelse/understanding-progpow-performance-and-tuning-d72713898db3>, Oct. 25, 2018, p. 1-12. (Year: 2018).*

*Primary Examiner* — Qing Chen
(74) *Attorney, Agent, or Firm* — Fishman Stewart PLLC (57) ABSTRACT

A system and method for utilizing the processing power of computing devices such as smart devices are provided. The system includes one or more distributed smart devices and a management server that communicates with the smart devices in order to determine whether they are idle and whether viable compute tasks are present that can be performed on the smart devices based on the smart device's status, configuration, utility and network parameters, and availability. Some tasks may be performed in low power mode to save energy.

14 Claims, 7 Drawing Sheets

(56) References Cited

U.S. PATENT DOCUMENTS

| | | | |
|---|---|---|---|
| 2012/0155347 A1* | 6/2012 | Husted | H04W 52/0229 370/311 |
| 2012/0266002 A1* | 10/2012 | Kim | G11C 11/418 713/320 |
| 2013/0214600 A1* | 8/2013 | Van De Poel | H04N 21/4436 307/31 |
| 2013/0276094 A1* | 10/2013 | Prat | H04L 63/0227 726/15 |
| 2016/0147292 A1* | 5/2016 | Sunwoo | G06F 1/1677 713/323 |
| 2019/0042157 A1* | 2/2019 | Bonen | G06F 3/0647 |

* cited by examiner

COMPUTING SYSTEM TRANSLATION TO PROMOTE EFFICIENCY

CROSS-REFERENCE TO RELATED APPLICATIONS

This application claims priority to U.S. patent application Ser. No. 16/587,860 filed on Sep. 30, 2019, which claims priority to Provisional Patent Application No. 62/892,029, filed on Aug. 27, 2019, the contents of both of which are hereby incorporated by reference in their entirety.

TECHNICAL FIELD

The present disclosure generally relates to the fields of distributed computing and, more particularly, to a method of utilizing distributed smart devices.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Advances in manufacturing, mechanical design, electronics, networking, and software engineering have enabled new classes of useful "smart" devices such as autonomous or semi-autonomous drones and self-driving vehicles. The intelligence of these devices comes in large part from the significant computing power built into them. This includes for example large numbers of processing cores that are able to quickly process large amounts of data to enable features like self-navigation, object detection, and collision avoidance.

This significant processing power contributes at least in part to the higher overall cost of these smart devices. As a result of this higher cost, not all people or organizations that could benefit from the services provided by these smart devices are be able to afford them. Similarly, even customers that can afford them may prefer to offset some of the significant expense associated with purchasing or leasing these smart devices.

In addition, the smart devices may not even be fully utilized during their lifecycles. For example, autonomous drones intended for use during emergencies by police or search and rescue units may sit ready but idle for significant amounts of time until needed. Devices in such idle power modes may consume electrical power that not provide a material benefit and/or that may not be utilized efficiently.

For at least these reasons, there is a desire for a solution to recoup or offset some of the expense associated with smart devices or to increase their utility during their lifecycle.

The foregoing discussion is intended only to illustrate examples of the present field and is not a disavowal of scope.

SUMMARY

For at least the reasons outlined above, there is demand for a system and method for harvesting remnant cycles from smart devices in accordance with the present invention. Remnant cycles are compute cycles that are available while the smart device is idle (e.g., not in use). By better utilizing these remnant cycles to perform viable compute tasks (e.g., hashing calculations for blockchain networks), their overall utility may be increased and in some embodiments the cost of smart devices costs may be at least partially offset.

In one example, the system comprises one or more smart devices, each having computing cores, a network interface, and a remnant cycle harvester. The harvester causes "available for work" notifications to be transmitted via the network interface in response to detecting that the smart device is in an idle state and on mains power. The system also includes a management server configured to distribute viable compute tasks to the smart devices in response to receiving the available for work notifications. In some embodiments, the smart devices are mobile autonomous drones or self-driving vehicles.

In one embodiment, the management server selects "viable" compute tasks based on location-based and time-based utility rates for the smart devices, an estimated power usage to complete the compute tasks, and an estimated reward (e.g., payment or value that may be received for completing the compute tasks). If the reward is not guaranteed, an estimated probability for receiving the reward may be used in determining the estimated reward. The management server may also select viable compute tasks based on the type of the computing cores in each smart devices.

In some embodiments, the management server may also select viable compute tasks based on current network costs, latency and bandwidth for the type of network used by the smart device. The management server may dynamically reallocate compute tasks to selected smart devices based on changes in the network latency or the network bandwidth. The compute tasks may for example be blockchain proof of work processing (e.g., hash calculations), image processing, or overlay network encryption and routing.

The management server may also use an availability calendar and not distribute compute tasks to specified smart devices based on the availability calendar despite receiving an available for work notification from the specified smart devices.

In some embodiments, the smart devices may have one or more temperature sensors, and the remnant cycle harvester may be configured to report the temperature to the management server. The management server may refrain from sending compute tasks to a particular smart device based on reported temperature. Similarly, the management server may refrain from sending compute tasks based on network attributes, including for example network latency, bandwidth limitations, or cost. The threshold latency may be based on the type of compute task (e.g., lower latency tolerance for real time or near-real time tasks).

A method for harvesting remnant cycles in a network of smart devices is also contemplated. In one embodiment, the method may comprise determining if a smart device in the network is idle on mains power and checking a compute task for viability on a particular smart device. This may be determined by comparing: (i) a utility cost for the smart devices, (ii) an estimated power usage for performing the task on the smart device, and (iii) an estimated reward for completing the task. If the task is viable, it is transmitted to the smart device if it is idle. The compute task can be selected from a plurality of blockchain networks and can involve calculating hashes that meet a predetermined difficulty level for a blockchain network. In other embodiments the compute tasks may involve performing object detection on images or video streams.

In another embodiment, a system for harvesting remnant processing cycles from smart devices is contemplated. The system may comprise one or more smart devices that transmit idle indicators and a manager module in network communication with the smart devices. The manager module receives the idle indicators and responds by transmitting viable work tasks to the idle smart devices. The viable work tasks can be blockchain hashing calculations, and the smart devices receive and execute the transmitted work tasks and transmit completed work tasks. The manager module may be configured to select the viable work tasks based on at least the following: an estimated power cost for the smart device receiving the viable work task based on location, an estimated power usage amount for performing the compute task on the smart device, and an estimated reward for the compute task. The estimated reward may be calculated based on a probability of receiving payment for completing the compute task and an estimated payment amount for completing the compute task.

In one example, a computing system comprises a first computing device and a second computing device that includes a processor and a compiler. The first computing device is configured to obtain a profile of the second computing device and select an algorithm from a plurality of algorithms for the processor of the second computing device to compute while the second computing device is in an idle power mode. It also provides instructions for computing the selected algorithm, and the compiler is configured to automatically convert the instructions to a different language that is compatible with the processor.

In some examples, the profile includes a model or part number, a voltage, a clock speed, and/or an expected instruction language. The selected algorithm can correspond to a maximum expected efficiency value of the plurality of algorithms. The first computing device may be configured to obtain an idle power consumption of the second computing device. The selected algorithm may correspond to an expected power consumption that is less than or equal to the idle power consumption. The selected algorithm may correspond to a maximum expected value of the plurality of algorithms with an expected power consumption less than or equal to the idle power consumption. The first computing device may be configured to test the plurality of algorithms for the second computing device prior to selecting the selected algorithm. The first computing device may be configured to store results of testing the plurality of algorithms for use in selecting algorithms for other second computing devices.

In one example, a method of operating a computing system having a plurality of computing devices is disclosed. The method may comprise using a first computing device to obtain a profile of a processor of a second computing device and selecting, via the first computing device, a list of algorithms, from a plurality of algorithms, for the second computing device. The method may further comprise testing operation of the second computing device with the algorithms of the list of algorithms and storing results from the testing in a storage device connected to the first computing device. The method may also comprise determining the most efficient algorithm from the list of algorithms and providing instructions from the first computing device to the second computing device for computing the most efficient algorithm, which are translated, via a compiler of the second computing device from a first language to a second language. The translated instructions are provided in the second language to the processor of the second computing device; and the second computing device is operated according to the translated instructions to compute the most efficient algorithm.

The profile may include a part number of the processor, a voltage of the processor, a clock speed of the processor, and an indication of the second language. The method may further comprise determining when the second computing device is operating in a low power mode, wherein operating the second computing device according to the instructions includes operating the second computing device according to the instructions only when the second computing device is in the low power mode.

The second computing device may be operated according to the instructions includes operating the second computing device without substantially increasing power consumption of the second computing device.

The method may comprise obtaining a low power consumption of the second computing device, wherein operating the second computing device according to the instructions includes operating the second computing device with a power consumption at or below the low power consumption.

The most efficient algorithm may not cause the second computing device to consume more power than the low power consumption, and cryptocurrency rewards may be automatically converted for computing the most efficient algorithm into a fiat currency and crediting an account associated with an owner of the second computing device with the fiat currency. The method may further comprise testing operation of the second computing device with the algorithms of the list of algorithms includes simulating performance of the second computing device.

The foregoing and other aspects, features, details, utilities, and/or advantages of embodiments of the present disclosure will be apparent from reading the following description, and from reviewing the accompanying drawings.

DETAILED DESCRIPTION

Reference will now be made in detail to embodiments of the present disclosure, examples of which are described herein and illustrated in the accompanying drawings. While the present disclosure will be described in conjunction with embodiments and/or examples, it will be understood that they do not limit the present disclosure to these embodiments and/or examples. On the contrary, the present disclosure covers alternatives, modifications, and equivalents.

Various embodiments are described herein for various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Figure 1:
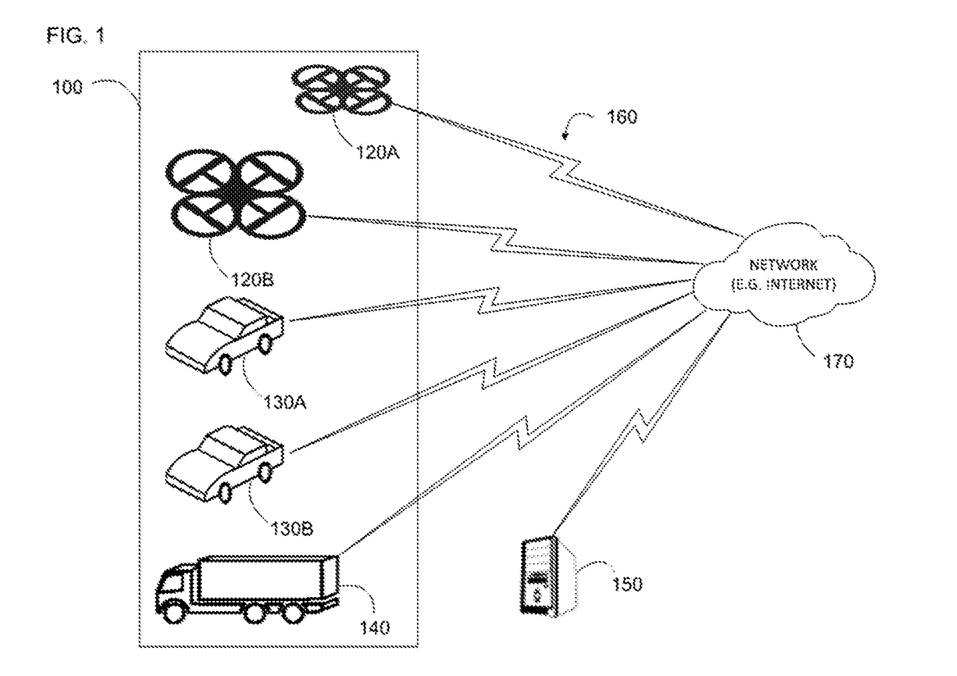
FIG. 1 is an illustration of one example of a system for harvesting remnant cycles in smart devices according to teachings of the present disclosure.

Referring now to FIG. 1, one example embodiment of a system for harvesting remnant cycles in embedded smart mobile devices is illustrated. The system includes one or more smart devices 100. The smart devices 100 can comprise, for example, one or more intelligent drones 120A-B, one or more autonomous vehicles such as self-driving cars 130A-B and self-driving truck 140. Each of smart devices 100 are coupled via network connections 160 to a communications network 170. Network connections 160 are preferably wireless network connections, e.g., Wi-Fi (IEEE 802.11), 4G, 5G, but wired connections are also possible when the smart devices 100 are stationary (e.g., when idle and parked or docked for charging). Network 170 is preferably the Internet, but other networks are possible, including private local area networks (LAN) or wide area networks (WAN), or virtual private networks (VPNs) or secure overlay networks running over the Internet or other WAN. Management server 150 is also connected to network 170 via a similar network connection 162 and is able to communicate with smart devices 100 via network 170.

As described in greater detail in connection with FIG. 2 below, smart devices 100 include sensors and significant processing power enabling autonomous or semi-autonomous operation. For example, smart devices 100 may include high resolution cameras and numerous processors capable of performing various real-time or near real-time image processing operations that are useful for object detection and collision avoidance. This significant processing power can increase the cost smart devices 100 and yet typically remains unused or under-utilized for significant periods of time when smart devices 100 are idle (e.g., docked or plugged-in for charging, or even when charged and simply waiting to be used). The example system illustrated in FIG. 1 is configured to improve this situation by having management server 150 select and distribute viable processing tasks via network 170 to smart devices 100 when they idle (e.g., unused or under-utilized). With this system and method, owners of smart devices 100 can receive greater value from smart device 100 or potentially offset some of the purchase or least cost.

Figure 2:
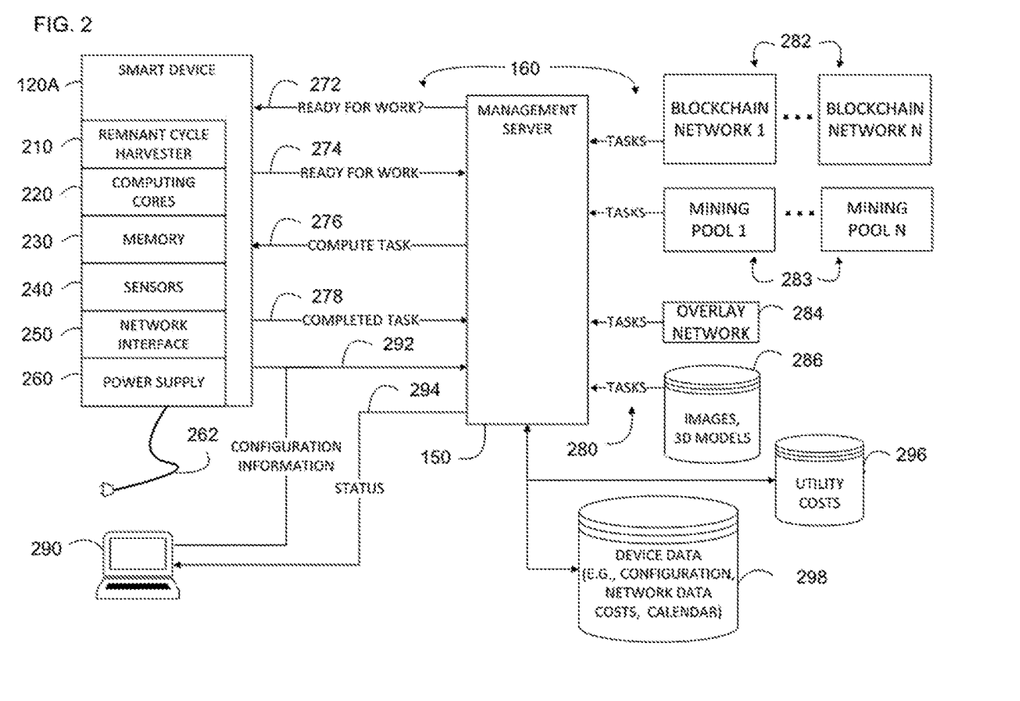
FIG. 2 is an illustration of another example embodiment of harvesting remnant cycles in smart devices according to teachings of the present disclosure.

Referring now to FIG. 2, additional details of one example embodiment of a system for harvesting remnant cycles in embedded smart mobile devices are illustrated. In this example embodiment, example smart device 120A comprises a remnant cycle harvester 210, computing cores 220, memory 230, sensors 240, network interface 250, and power supply 260. Remnant cycle harvester 210 is preferably implemented in software that is stored on non-volatile storage in smart device 120A and loaded into memory 230 and run by the operating system controlling smart device 120A after smart device 120A powers up. Remnant cycle harvester 210 may also be implemented in firmware that is loaded into smart device 120A, e.g., as part of BIOS.

Computing cores 220 may be general purpose central processing units (CPUs), but more preferably they comprise large numbers of specialized processing cores such as graphics processing units (GPUs), field programmable gate arrays (FPGAs), or application specific integrated circuits (ASICs). While general purpose CPUs are capable of performing the calculations necessary for processing compute tasks 276, GPUs, FPGAs, and ASICs may be significantly faster and more energy efficient when performing compute tasks 276, thereby increasing the utility of the system.

As noted above, smart device 120A is preferably configured with sensors 240 to enable autonomous or semi-autonomous operation including self-navigation, object detection, and collision avoidance. When in active operation, sensors 240 capture data such as images or video into memory 230 for processing by computing cores 220. Smart device 120A is powered by power supply 260, preferably a high energy density lithium ion battery pack. Smart device 120A is configured to connect to mains power by charger 262, which may for example be a power cable from a charging station, a wired docking station, or wireless charging pad. Smart device 120A is configured to communicate with management server 150 via network 160 through network interface 250.

Management server 150 can be implemented in software running on a general-purpose computer or server, or in a dedicated appliance. Management server 150 is configured to send and receive messages via network 160. In one embodiment, management server 150 is configured to periodically send ready for work query message 272 to smart device 120A to inquire as to whether smart device 120A is in a "ready for work" state. Smart device 120A may be configured to respond with one or more ready for work messages 274 if smart device 120A is available and ready to work on additional compute tasks. Ready for work message 274 may include additional information about the current status of smart device 120A (e.g. the temperature of the ambient air by the smart device 120A, or the temperature of one or more components within smart device 120A, power supply 260 status, and location).

The criteria for being available and in a ready to work state may include, for example, being stationary, being idle (e.g., below a predetermined threshold of utilization of computing cores 220), being connected to mains power, and/or having a fully charged or nearly fully charged battery pack. Additional criteria may include one or more temperature sensors in sensors 240 indicating that the ambient temperature around smart device 120A or the internal temperature of computing cores 220 is below a predetermined threshold safe temperature. Performing compute-intensive tasks on smart device 120A when the battery is not fully charged or almost fully charged may undesirably slow the rate of battery charging if power supply is current limited. This could interfere with smart device 120A being ready to perform its primary purpose. Performing compute-intensive tasks on smart device 120A when the temperature is above the predetermined threshold safe temperature may cause undesirable thermal stress to the components of smart device 120A and may increase the probability of premature component failure. In another embodiment, the criteria for being in a ready to work state may include one or more humidity sensors in sensors 240 indicate that the ambient humidity is below a predetermined threshold. High humidity can have negative effects on electronic components. For example, long periods of operation in high humidity environments can decrease the insulation resistance in electrolytic capacitors that are commonly used in electronics such as power supply 260.

In some embodiments, remnant cycle harvester 210 may be configured to periodically send available for work notification 274 via the network interface 250 to management server 150 when smart device 120A meets the read to work criteria. In other embodiments, remnant cycle harvester may be configured to wait for ready for work query messages 272 from management server 150 before sending ready for work messages 274.

In response to ready for work messages 274, management server 150 is configured to send selected compute tasks 276 to smart device 120A via network 160. Compute tasks 276 may be selected from one or more sources. For example, compute tasks 276 may be selected from one or more blockchain networks 282 or mining pools 283. One common example of this type of compute tasks is calculating nonces to find hashes that meet a specified level of difficulty for the particular blockchain network. These types of compute tasks are common for blockchain networks based on proof of work principles such as Bitcoin. The management server can be configured to select compute tasks directly from one or more blockchain networks (e.g., Bitcoin, Ethereum, Litecoin) or indirectly through mining pools. Mining pools share work and distribute rewards to members, often based on the amount of computation performed by each member. In one example embodiment, the management server acts as its own Bitcoin mining pool and changes a value in the Bitcoin coinbase message for each smart device to which compute tasks are assigned. The compute tasks may for example include calculating SHA-256 hashes for a series of nonces in an attempt to calculate a hash meeting a specific level of difficulty (e.g., less than a particular value specified by the particular blockchain network). In this embodiment, management server 150 may also be configured to allocate rewards received to each of smart devices 100 based on the total amount of work performed by each. This information may be stored in the device data storage 298 and presented to remote client 290 on an aggregate or per smart device basis.

Other types of compute tasks 276 that management server 150 may send to smart device 120A include network packets for routing and or encryption/decryption as part of an overlay network 284, e.g., using onion routing or secure virtual private network (VPN). Another type of compute task 276 that management server 150 may send to smart device 120A is image or 3D model data 286 that needs to be processed. Examples of the type of compute task 276 for these types of date include performing object detection on still images or frames from a video or rendering frames based on a 3D model (e.g., ray tracing).

In response to receiving compute task 276. Smart device 120A may be configured to perform the compute task using computing cores 220 and then send the results of the completed task 278 back to management server 160 or to some other destination on network 160 that management server 150 designates. Management server may be configured to forward the completed tasks 278 that it receives from smart device 120A (and other smart devices 120) to blockchain networks 282 or mining pools 283, or other destinations based on the type of compute task that is completed. For example, management server may be configured to combine the computed tasks 278 from multiple smart devices 120 and then send the combined results to blockchain networks 282 or mining pools 283 via network 160.

Management server 150 and may be configured to receive configuration information 292 from remote clients 290 (e.g., via a web browser interface) and or directly from smart device 120A. Example configuration information may include information about smart device 120A including the type and number of computing cores 220, battery status, whether or not smart device 120A is connected to mains power, the location of smart device 120A, the temperature of smart device 120A (either internal component temperature or ambient temperature), the humidity near smart device 120A, utility costs at the location of smart device 120A, and any network costs that smart device 120A incurs for using network 160. Configuration information 292 may include an availability calendar to expressly prevent smart device 120A from doing compute tasks during certain times even if idle. For example, if the owner of smart device 120A wants to ensure that no compute tasks are processed during certain maintenance windows, those times could be entered via remote client 290. Maintenance server 150 may be configured to store configuration data in a local data store or in a local or remote database 298 accessible via network 160.

Utility costs can contribute significantly to whether certain compute tasks are viable (e.g., profitable or worth executing) on a particular one or more of smart devices 120 at a particular location. Utility costs ma be manually entered via remote client 290, directly on management server 150, or accessed from external networked data sources (e.g., a web service providing utility rates based on location). Database or table of stored utility rates 290 is accessible by management server 150 locally or via network 160. Database 290 can be static or time-varying (e.g., updated in real-time or periodically), and can include information on different utility rates per day of week or time of day (e.g., off-peak rates). In some embodiments, this information may be obtained directly from utility companies, or from the owner or lessee of smart device 120A (e.g., as entered on remote console 290) or by the administrator of management server 150 as entered locally.

Management server may store this information in a local or remote database of utility costs 296. In some embodiments, smart devices 120 are mobile and may be different parts of the country at different times. Management server 150 may be configured to determine the applicable utility rates for the particular location based on the location of the smart device (as reported by the smart device) and optionally the local time for the smart device as well. Some utilities charge different rates at different times of the day, so knowing the smart devices location and local time can improve the accuracy of the cost determination made by management server 150 and improve the determination of whether the particular compute task can be completed profitably by the smart device in its current location.

Network data costs may also contribute to whether certain compute tasks are viable (e.g., profitable or worth executing) on a particular one or more of smart devices 120 at a particular location. For example, if smart device 120A is mobile, it may have free access to Wi-Fi in certain locations but no others. Network costs may be manually entered via remote client 290, directly on management server 150, or accessed via an external database of network costs and other configuration data 298. Management server 150 may be configured to determine the applicable network costs for smart devices 120 based on the location of the smart devices (as reported by the smart device) 120. Some network provided provide a specified amount of network data before charging extra. This information can be provided to management server 150 directly or via remote client 290 and stored in a local or remote database of configuration information 298.

Management server 150 may be configured to select viable compute tasks 276 to be sent to smart devices 120 based one or more criteria of the following criteria: the type and number of computing cores 220 available on smart device 120A (e.g., estimated time required to complete the compute task); the estimated reward for completing the compute task; the estimated cost to complete compute task 276 on smart device 120A (based at least in part on utility costs 296); whether the estimated reward is greater than the estimate cost, and if so by how much; whether smart device 120A is available for compute tasks based on an availability calendar (e.g., stored as part of device configuration data 298); network attributes for the smart device, including for example network latency, available network bandwidth, and network data cost based on the device's location). For example, if the estimated reward is greater than the estimated cost of performing the compute task on computing cores 220 (e.g., given smart device 120A's current location and the utility rates for that location at the current time), and if the compute task can be completed in a reasonable amount of time (e.g., given the number and type of computing cores 220 in smart device 120A), then the compute task may be determined by management server 150 to be viable for smart device 120A.

In one embodiment, management server 150 may be configured to send compute tasks to smart devices 120 to maximize overall system profits, e.g., by distributing compute tasks 276 to one or more smart devices 120 even if some of they would execute individual compute tasks 276 at a loss, if the system is required to do so to maximize overall system profitability (e.g., to complete compute task within a predetermined deadline and thereby secure profitability as a whole across the system even if some smart devices do not complete their compute tasks 276 at a profit).

In another embodiment, smart device 120A may apply some or all of these criteria to perform its own determination of whether or not to process compute task 276 once the task is received from management server 150. Management server 150 may be configured to provide some or all of the data for the criteria to smart device 120A. For example, smart device 120A may perform its own calculation of cost or its own determination of whether the temperature is too high to safely perform compute task 276. Smart device 120A may be configured to report the reason or reasons for declining to perform compute task 276 to management server 150 in lieu of completed task 278. Management server 150 may be configured to store this information in device data database 298 for later reporting to remote client 290.

Management server 150 may also be configured to provide remote client 290 a dashboard displaying operating status and statistics for smart devices 100, including for example, idle status, profit contributions, and time spent on computing task.

Figure 3:
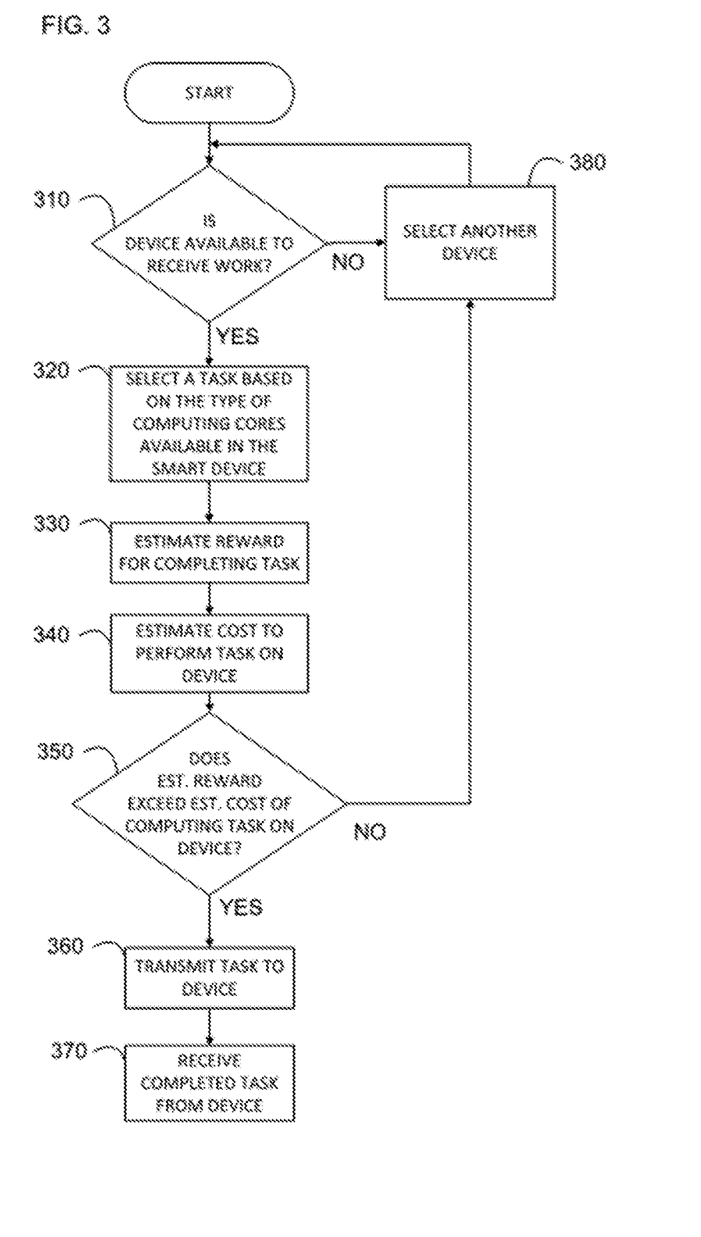
FIG. 3 shows an example embodiment of a method for harvesting remnant cycles in smart devices according to teachings of the present disclosure.

Turning now to FIG. 3, one example embodiment of a method for harvesting remnant cycles in smart devices is illustrated. In step 310, management server 150 is configured to determine whether a particular one of smart devices 100 is available to receive work, e.g., available to perform a viable compute task 276. In step 360, if the device is not available, another device from smart devices 100 is selected.

In step 320, management server 150 is configured to select a compute task 280 for assessment of viability. In one embodiment, the task may be selected from a set of tasks awaiting to be performed based on the type of computing cores 220 present in smart device 120A. For example, if computing cores 220 are GPUs, tasks particularly suited to GPUs (e.g., ASIC-resistant cryptocurrency mining like Vertcoin or Monero) may be selected. If FPGAs are present, management server 150 may be configured to convey Verilog or VHDL (VHSIC Hardware Description Language, where VHSIC stands for Very High Speed Integrated Circuit) to smart device 100 to configure the FPGA to efficiently execute compute tasks 276.

In step 330, management server 150 or smart devices 100 are configured to determine the reward for completing the task. In some embodiments, this reward may be based on estimates from the data source providing the compute tasks (e.g. a cryptocurrency mining pool). In other embodiments, the reward can be estimated or calculated using a formula such as Equation 1.

$$\text{reward} = \frac{50}{\text{difficulty}} \times \frac{\text{hashrate} \times \text{time period}}{2^{32}} \quad \text{Equation 1}$$

The hashrate can be based on a lookup table of pre-measured hashrates based on the number and type of core in computing cores 220. Or in another embodiment, as part of initial configuration management server 150 may be configured to have each smart devices 100 execute a small initial set of compute tasks (e.g., calculate hashes for a predetermined amount of time) in order to determine an acceptable hashrate value. The difficulty value may determined directly from the particular cryptocurrency network, as these values typically change over time.

In step 340, management server 150 is configured to estimate the cost to execute compute task 276 on smart device 100. Energy cost is typically a significant contributor to the execution cost for computing, and in one embodiment this is calculated according to Equation 2.

$$\text{energy cost} = \text{time required to complete (in second)} \times \quad \text{Equation 2}$$
$$\text{energy usage while calculating (in watts)} \times$$
$$\text{utility cost (in kilowatt hours)} \times \frac{\text{hour}}{3600 \text{ sec}})$$

In step 350, management server 150 is configured to determine whether the estimated, calculated, or actual rewards exceed the estimated, calculated, or actual cost to execute on the selected smart device 100. If the reward exceeds the cost, the compute task 276 is determined to be viable. If the rewards do not exceeds the cost, compute task 276 is determined to not be viable for the selected smart device 100, and another smart device 100 is selected in step 380.

If viable, in step 360 management server 150 is configured to send the viable compute task 278 to selected smart device 100 for execution. In step 370, once compute task 278 is completed, selected smart device 100 sends the results back to management server 150 (or to another appropriate destination such as a blockchain network 282 or mining pool 283).

In some embodiments, viability may also depend on other criteria, (e.g., rewards may need to exceed costs by a predetermined threshold to account for wear and tear on smart device 120A, transaction costs associated with currency conversions, or taxes).

Figure 4:
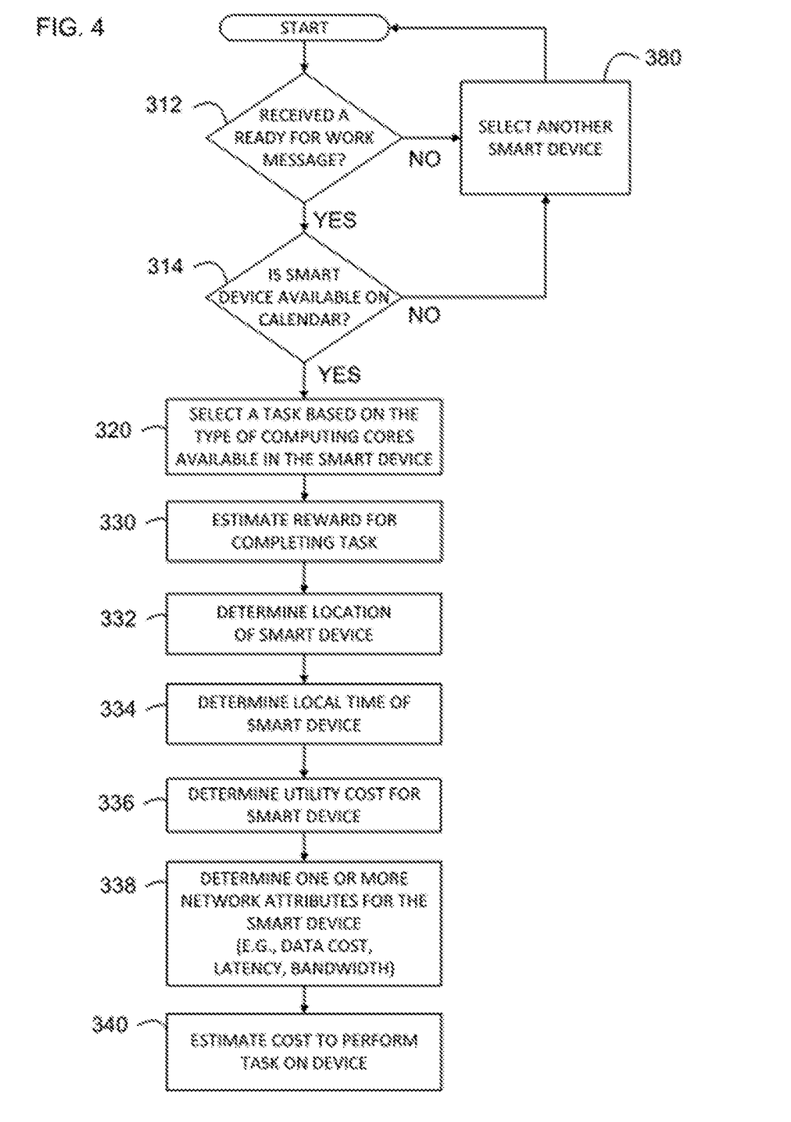
FIG. 4 shows details of another example embodiment of a method for harvesting remnant cycles in smart devices according to teachings of the present disclosure.

Turning to FIG. 4, additional details of an example embodiment of the method illustrated in FIG. 3 are shown. In this embodiment, step 310 from FIG. 3 is replaced with steps 312 and 314. In step 312, management server 150 is configured select another smart device if a ready to work message has not been received from the selected smart device 100. Management may be configured to periodically query smart devices 100 as to their status, or smart devices 100 may be configured to themselves periodically send ready for work status messages when they are idle without being queried by management server 150.

In this embodiment, step 340 from FIG. 3 further comprises step 342-348. In step 342, management server 150 is configured to determine the location of the selected smart device 100. This may be accomplished for example by accessing static location information provided via remote client 290 and stored in device data store 298 during initial setup. Or the selected smart device 100 may provide location information to management server 150 (e.g., as part of ready to work message 274) based on GPS. Or management server 150 may be configured to determine location based on network address information from ready to work message 274.

In step 344, management server 150 may be configured to determine the local time applicable to the current location of the selected smart device 100. In step 346, management server 150 may be configured to determine the utility cost based on the local time. In step 348, the management server 150 may be configured to determine one or more network attributes for the smart device that may also be used to determine the cost and whether or not compute task 276 is viable for the selected smart device 100. For example, any data costs may be added to the total estimated cost of executing the task. Additional factors such as network latency and bandwidth limitations may also cause a task not to be viable. Some compute tasks 276 may require lower latencies (e.g., overlay network operations involving real-time audio or video). Similarly, some compute tasks 276 may require significant bandwidth (e.g., processing video data). As smart devices 100 may move over time and network connections 160 may vary over time, these network attributes may be periodically measured by management server to ensure sufficient data for step 348 is present.

Figure 5:
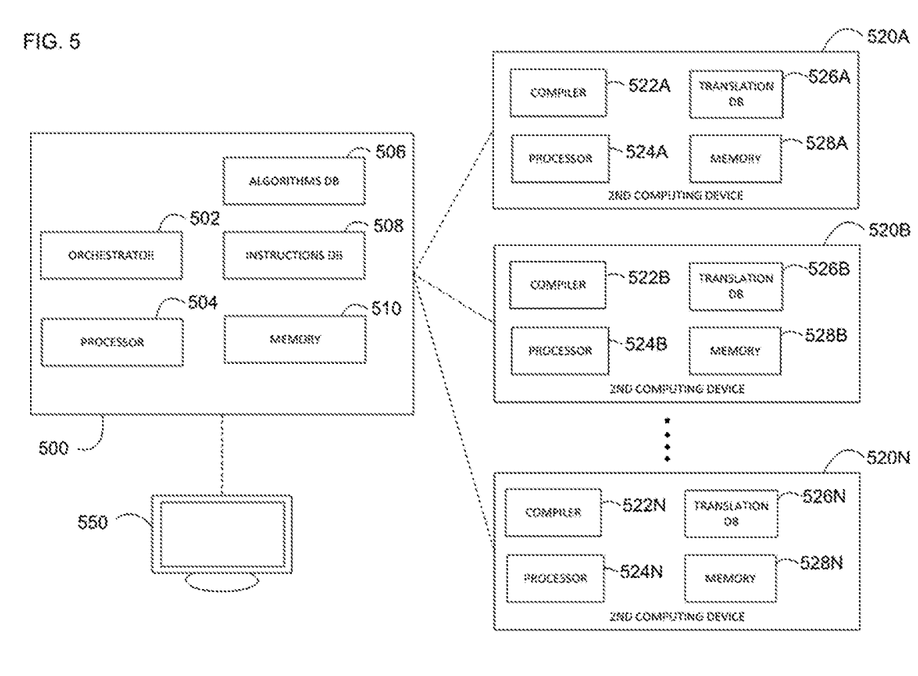
FIG. 5 is a schematic view generally illustrating an embodiment of a computing system according to teachings of the present disclosure.

Turning now to FIG. 5, one embodiment of a computing system is shown. It may include one or more computing devices 520A-N that may include one or more of a variety of configurations. Computing devices 520 may, for example, include an electronic controller and/or an electronic processor 524A-N, such as a programmable microprocessor and/or microcontroller. A computing device 500 may include a central processing unit (CPU), an application specific integrated circuit (ASIC), a GPU (graphics processing unit), and/or an FPGA (field programmable gate array), a memory (e.g., a non-transitory computer-readable storage medium), and/or an input/output (I/O) interface. It may also include a memory 510. Computing device 500 may be configured to perform various functions, including those described in greater detail herein, with appropriate programming instructions and/or code embodied in software, hardware, and/or other medium. In examples, computing device 500 may include a plurality of controllers and/or processors. Computing device 500 may be connected to a display 550, such as a touchscreen display.

With examples, a computing system may include a first computing device 500 and/or one or more second computing devices 520A-N that may or may not be disposed in different locations and connected via a network. Computing device 500 may, for example, include a server or control computing device, and/or may be configured to control (e.g., program, load, direct, initialize, set up, flash, etc.), at least in part, operation of the one or more second computing devices 520A-N. The second computing devices 520A-N may, for example and without limitation, include consumer electronic devices, such as motor controllers (e.g., of recirculation pumps, heat pumps, etc.), audio equipment (e.g., amplifiers/ receivers), modems, networking equipment, furnaces, refrigerators, televisions, motor vehicles, airplanes, monitors, personal computers, tablets, phones, printers, security cameras, clothes washers, clothes dryers, drones, robots, and/or smart appliances, among others, which may include respective processors 524A-N and/or memories 528A-N.

In examples, one or more second computing devices 520A-N may operate to provide a primary function and/or may include idle, standby, and/or other low power modes that may, for example, be utilized as an alternative to completely powering down the device, such as to improve response time (e.g., transitioning back to or starting full operation of the primary function). Such low power modes may involve the second computing devices 520A-N operating with a low power consumption. The low power consumption may correspond to power consumption by processors 520A-N and/or memory 528A-N of the second computing device that not be performing or involved with performing the primary function while the second computing device 520A-N is in the low power mode (e.g., may be empty or unused power consumption).

Figure 6:
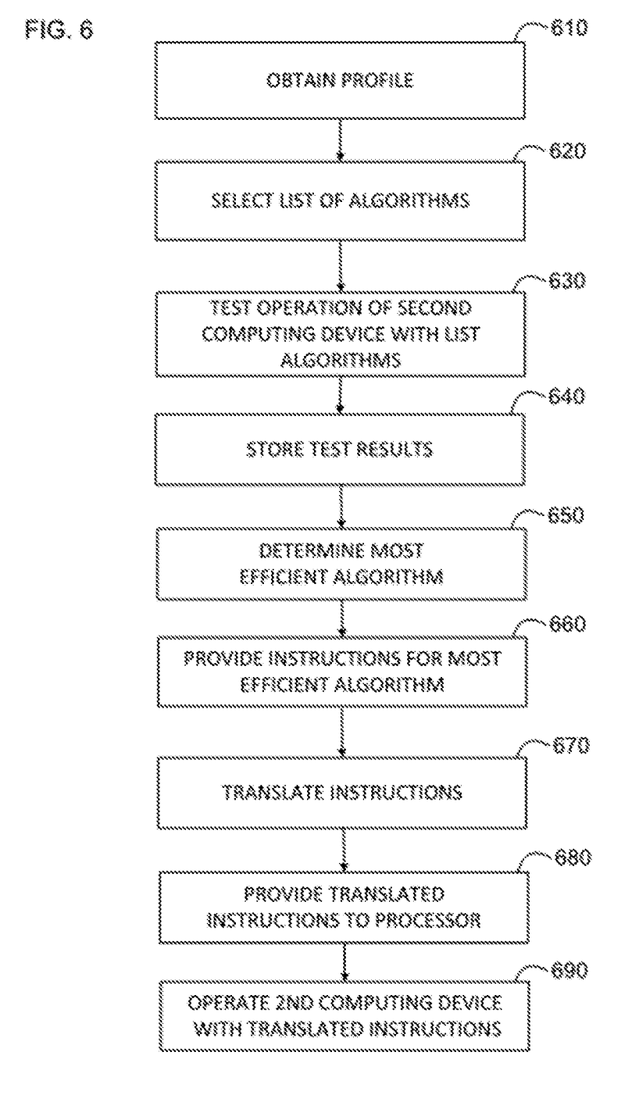
FIG. 6 is a flow chart generally illustrating an embodiment of a method of operating a computing system according to teachings of the present disclosure.

With examples, such as generally illustrated in FIG. 5 and FIG. 6, a first computing device 500 may be configured to control, at least in part, operation of the one or more second computing devices 520A-N. For example and without limitation, the first computing device may be configured to provide instructions to a second computing device, such as for computing a cryptocurrency algorithm (e.g., SHA-256, Ethash Scrypt, Equihash, Cryptonish, X11, etc.). Additionally or alternatively, the first computing device may include an orchestrator 502 that may be configured to communicate with and/or control one or more second computing devices 520A-N.

A first computing device 500 may be configured to determine an algorithm for the second computing device 520A-N to compute. Determining the algorithm for a second computing device 520A-N may include obtaining a profile of the second computing device 520A-N (step 610). The profile may include, for example, a model or part number, a voltage, a clock speed, an expected instruction language, a low power consumption, and/or one or more hardware specifications. With examples, a first computing device 500 may determine what algorithm a second computing device 520A-N should compute and/or what instructions to provide to a second computing device according, at least in part, to the obtained profile. For example and without limitation, a first computing device 500 may include and/or be connected to a look-up table or database of a plurality of algorithms 506 and may select a list of candidate algorithms (step 620), from the plurality of algorithms, for second computing devices 520A-N having the identified profile.

In examples, a first computing device 500 may be configured to test computation of some or all of the candidate algorithms by the second computing device 520A-N (step 630) and store the results (step 640). Testing computing may include the first computing device 500 causing the second computing devices 520A-N to compute a candidate algorithm for a period of time and determining a computational efficiency of the second computing device for the candidate algorithm. The computational efficiency may, for example and without limitation, be determined as a hash rate (e.g., hashes/second). Additionally or alternatively, testing may include a first computing device 500 simulating performance of the second computing devices 520A-N, such as via a model of the second computing devices 520A-N.

With examples, a first computing device 500 may be configured to obtain an expected efficiency value associated with an algorithm. For example and without limitation, an algorithm may be associated with a cryptocurrency (e.g., Bitcoin, Ethereum, Litecoin, Dash, Ripple, Monero, etc.), and a first computing device 500 may be configured to obtain a current value of the cryptocurrency (e.g., in a fiat currency, such as US Dollars, Euros, etc.). The first computing device 500 may determine an expected revenue of the second computing device computing the candidate algorithm, such as according, at least in part, to the computational efficiency and the current value of the cryptocurrency associated with the algorithm.

Determining the expected efficiency value of a second computing device associated with an algorithm may include determining an expected cost of the algorithm and comparing the expected cost with the expected revenue. Determining the expected cost may include determining an expected power consumption by the second computing device 520A-N while computing the algorithm and/or a current power cost/rate. The first computing device 500 may multiply the expected power consumption with the current power cost rate to determine the expected cost. The first computing device may determine the expected efficiency value associated with a candidate algorithm according, at least in part, to the difference between the expected revenue and the expected cost. The first computing device 500 may be configured to determine an expected efficiency value for each candidate algorithm and/or may compare the expected efficiency values of each candidate algorithm to identify the algorithm with the highest expected efficiency value (e.g., the most efficient algorithm, which may correspond to improved performance and/or reduced power consumption by the processor(s) and/or memory of the second computing device) (step 650) and provide instructions for the selected efficient algorithm (step 660).

In examples, a first computing device 500 may be configured to obtain and/or determine a low or idle power consumption associated with a second computing device 520A-N. The low power consumption may correspond to the power consumption of the second computing device 520A-N in an idle state, such as power consumption by processors and/or associated memory in the idle state. A first computing device may, for example and without limitation, obtain the low power consumption when obtaining a profile of the second computing device 520A-N.

With examples, the first computing device 500 may be configured to select, for the second computing device 520A-N to compute, the candidate algorithm with the highest expected efficiency value that also has an expected power consumption that is less than or equal to the low power consumption of the second computing device. For example and without limitation, the first computing device 500 may select a candidate algorithm that may not materially/substantially increase the power consumption of the second computing device 520A-N above the low power consumption.

In examples, the first computing device 500 may select instructions that may be used for computing the selected algorithm and/or may provide the instructions to a second computing device 520A-N. The instructions may be in a first language (e.g., a first coding language, a first instruction set architecture (ISA), etc.). A profile of a second computing device 520A-N may include the language (or languages) that the second computing device is configured for receiving and/or using instructions (e.g., a second language). If the first language and the second language are not the same, the instructions may be converted/translated to the second language (step 670).

In examples, a computing system may include a compiler 522A-N that may be configured to translate instructions from a first language one or more other languages. The compiler 522A-N may, for example and without limitation, be included with (e.g., stored on/in) the second computing device). The compiler 522A-N may be configured to parse instructions received in a first language to identify instruction portions. The compiler 522A-N may include and/or be connected to a database or other data store that may include mappings of instruction portions of the first language with substantially equivalent instruction portions in one or more other languages. The compiler 522A-N may be configured to create translated instructions for a second computing device 520A-N with the substantially equivalent instruction portions. In examples, the translated instructions may include modified versions of the original instructions that may be optimized for the second computing device. The compiler 522A-N may provide the translated instructions to a processor/chip of the second computing device (step 680) to compute the selected algorithm with the translated instructions (step 690).

With examples, a compiler 522A-N may be provided to a second computing device 520A-N in one or more of a variety of ways. For example and without limitation, the manufacturer of a second computing device 520A-N may flash the second computing device with a payload that may include the compiler and/or the database of instructions portions. Additionally or alternatively, the second computing device may be configured for communication with a storage device, local or remote, that may include the compiler and/or the database (e.g., an SD card, flash drive, remote computer server, etc.).

In examples, the same or substantially the same compiler may be provided to a plurality of second computing devices 520A-N that may include different configurations. For example and without limitation, the same compiler 522A-N may be provided to a second computing device 520A having a first configuration (e.g., an Azure sphere), a second computing device 520B having a second configuration (e.g., a Raspberry Pi), and/or a third computing device 520N having a third configuration (e.g., a VU3P FPGA). The compiler 522A-N on each of the three second computing devices 520A-N may be configured to translate instructions for the selected algorithm from a first language to a respective language for each of the three second computing devices. While this example includes three second computing devices, the compiler may be provided to substantially any number of second computing devices 520A-N that have common or different configurations.

With examples, after a first computing device 500 provides instructions to a second computing device 520A-N, the first computing device 500 may or may not continue to communicate with the second computing device 520A-N. For example and without limitation, after a first computing device 500 provides instructions to a second computing device 520A-N, the second computing device may be disconnected from the first computing device 500 and may operate independently of the first computing device 500. Additionally or alternatively, the second computing devices 520A-N may be reconnected to a first computing device 500, such as to monitor, update, and/or upgrade the second computing device 520A-N.

Figure 7:
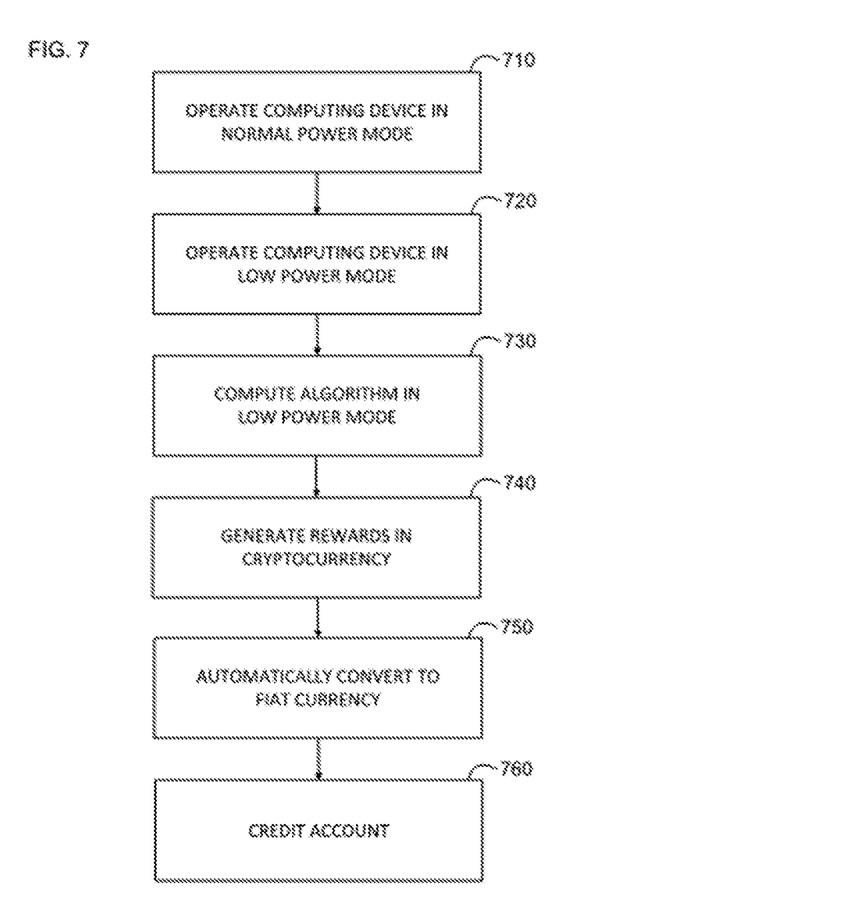
FIG. 7 is a flow chart generally illustrating an embodiment of a method of operating a computing device according to teachings of the present disclosure.

Turning now to FIG. 7, one example embodiment of a method of operating a computing device (e.g., a second computing device) is illustrated. The example method may include operating the computing device in a normal power mode (step 710), such as to perform a primary function. The method may include transitioning the computing device to a low power mode and operating the computing device in the lower power mode (step 720). The method may include computing an algorithm with a processor of the computing device while operating the computing device in the low power mode without substantially increasing a power consumption of the computing device (step 730). Such computing may use power that may otherwise be wasted (e.g., the second computing devices may operate more efficiently).

With examples, the method may include generating rewards in a cryptocurrency for computing the algorithm (step 740), automatically converting the rewards into a fiat currency (step 750), and/or crediting an account with the reward in the fiat currency (step 760).

For example and without limitation, a computing device may be configured to provide rewards for computing a selected algorithm (e.g., cryptocurrency mining) to an account associated with the owner of the second computing device. The rewards may, at least initially, be generated in the cryptocurrency associated with the selected algorithm. A first computing device and/or a second computing device may be configured to automatically convert rewards from cryptocurrency into a fiat currency. For example and without limitation, the first computing device and/or the second computing device may be configured to communicate with a cryptocurrency exchange to convert cryptocurrency rewards into a fiat currency that may be chosen by an owner of the corresponding second computing device. Additionally or alternatively, the first computing device and/or the second computing device may be configured to generate and/or interact with a smart contract. The smart contract may, for example, be configured to receive rewards associated with the second computing device and, once a threshold amount of rewards have been earned (e.g., in a cryptocurrency associated with the selected algorithm), the smart contract may automatically credit an electronic wallet associated with the owner of the second computing device with fiat currency.

In examples, a computing system may include large number of second computing devices (e.g., hundreds, thousands, millions, etc.). A large number of second computing devices computing algorithms with idle power may improve the efficiency of the second computing devices and/or may improve the stability of one or more cryptocurrencies. For example and without limitation, increasing the number of second computing devices computing an algorithm (e.g., mining a particular cryptocurrency) may increase the number of transactions using that cryptocurrency (e.g., conversions of rewards to fiat currencies), which may increase transaction fees, which may incentivize additional second computing devices to compute the algorithm, which may increase the value of the associated cryptocurrency, which may increase the mining reward.

With examples, a second computing device may generate and/or obtain data relating to the second computing device. For example and without limitation, if the second computing device includes a refrigerator, the second computing device may generate data relating to how much power is consumed, how often the doors are opened, ambient temperatures, lights or other components that experience errors or malfunctions, and/or products that may be stored therein, among other data. A user or owner of the second computing device may allow one or more third parties to access such second computing device data, such as via a subscription agreement via which the third party pays the user or owner for the data. The data may be tokenized, such as via the second computing device or another computing device, prior to being provided to a third party. Tokenizing the data may include linking the data to the second computing device, such as with an identifier (e.g., a unique identifier) associated with the second computing device.

In examples, a third party receiving data from a second computing device may use the data to suggest one or more actions to the user or owner of the second computing device. For example and without limitation, if data from the second computing device suggests that a light (or other component) of the second computing device needs to be replaced or will need to be replaced, the third party may suggest ordering a replacement component (and/or a related service) to the user or owner. Additionally or alternatively, the third party may automatically order the replacement part and/or service. The cost of the replacement component/service may be offset by the subscription fee and/or by the rewards obtained by the second computing device for computing an algorithm. If the cost of the replacement component/service is greater than the subscription fee and/or current rewards obtained by the second computing device, future rewards earned by the second computing device may be directed to the third party until the cost of the replacement component/service is covered. Once the cost of the replacement component/service is covered, further rewards earned by the second computing device may again be credited to an account associated with the user or owner of the second computing device.

It should be further understood that an article of manufacture in accordance with this disclosure may include a non-transitory computer-readable storage medium having a computer program encoded thereon for implementing logic and other functionality described herein. The computer program may include code to perform one or more of the methods disclosed herein. Such embodiments may be configured to execute via one or more processors, such as multiple processors that are integrated into a single system or are distributed over and connected through a communications network, and the communications network may be wired and/or wireless. Code for implementing one or more of the features described in connection with one or more embodiments may, when executed by a processor, cause a plurality of transistors to change from a first state to a second state. A specific pattern of change (e.g., which transistors change state and which transistors do not), may be dictated, at least partially, by the logic and/or code.

Reference throughout the specification to "various embodiments," "with embodiments," "in embodiments," or "an embodiment," or the like, means that a particular feature, structure, or characteristic described in connection with the embodiment is included in at least one embodiment. Thus, appearances of the phrases "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

All matter contained in the above description or shown in the accompanying drawings shall be interpreted as illustrative only and not limiting. Changes in detail or structure may be made without departing from the present disclosure.

It should be understood that a computer, a system, and/or a processor as described herein may include a conventional processing apparatus known in the art, which may be capable of executing preprogrammed instructions stored in an associated memory, all performing in accordance with the functionality described herein. To the extent that the methods described herein are embodied in software, the resulting software can be stored in an associated memory and can also constitute means for performing such methods. Such a system or processor may further be of the type having ROM, RAM, RAM and ROM, and/or a combination of non-volatile and volatile memory so that any software may be stored and yet allow storage and processing of dynamically produced data and/or signals.

It should be further understood that an article of manufacture in accordance with this disclosure may include a non-transitory computer-readable storage medium having a computer program encoded thereon for implementing logic and other functionality described herein. The computer program may include code to perform one or more of the methods disclosed herein. Such embodiments may be configured to execute via one or more processors, such as multiple processors that are integrated into a single system or are distributed over and connected together through a communications network, and the communications network may be wired and/or wireless. Code for implementing one or more of the features described in connection with one or more embodiments may, when executed by a processor, cause a plurality of transistors to change from a first state to a second state. A specific pattern of change (e.g., which transistors change state and which transistors do not), may be dictated, at least partially, by the logic and/or code.

What is claimed is:

1. A computing system, comprising:
a first computing device; and
a second computing device, including:
    a processor; and
    a compiler;
wherein the first computing device is configured to obtain a profile of the processor of the second computing device, select an algorithm from a plurality of algorithms for the processor of the second computing device to compute while the second computing device is in an idle power mode, and provide instructions for computing the selected algorithm from the plurality of algorithms;
wherein the selected algorithm from the plurality of algorithms corresponds to a maximum expected efficiency value of the plurality of algorithms;
wherein the first computing device is further configured to test the plurality of algorithms for the second computing device prior to selecting the algorithm from the plurality of algorithms; and
wherein the compiler of the second computing device is configured to automatically convert the provided instructions to a different language that is compatible with the processor of the second computing device.

2. The computing system of claim 1, wherein the profile of the processor of the second computing device includes a model or part number, a voltage, a clock speed, and/or an expected instruction language.

3. The computing system of claim 1, wherein the first computing device is further configured to obtain an idle power consumption of the second computing device.

4. The computing system of claim 3, wherein the selected algorithm from the plurality of algorithms corresponds to an expected power consumption that is less than or equal to the idle power consumption of the second computing device.

5. The computing system of claim 3, wherein the selected algorithm from the plurality of algorithms corresponds to a maximum expected value of the plurality of algorithms with an expected power consumption that is less than or equal to the idle power consumption of the second computing device.

6. The computing system of claim 1, wherein the first computing device is further configured to store results of the testing of the plurality of algorithms for the second computing device for use in selecting algorithms for other second computing devices.

7. A method of operating a computing system having a plurality of computing devices, the method comprising:
using a first computing device to obtain a profile of a processor of a second computing device;
selecting, via the first computing device, a list of algorithms, from a plurality of algorithms, for the second computing device;
testing operations of the second computing device with algorithms of the list of algorithms;
storing results from the testing of the operations of the second computing device in a storage device connected to the first computing device;

determining a most efficient algorithm from the list of algorithms, wherein the most efficient algorithm is an algorithm with a highest expected efficiency value;

providing instructions from the first computing device to the second computing device for computing the most efficient algorithm;

translating, via a compiler of the second computing device, the instructions from a first language to a second language;

providing the translated instructions in the second language to the processor of the second computing device; and operating the second computing device according to the translated instructions to compute the most efficient algorithm.

8. The method of claim 7, wherein the profile of the processor of the second computing device includes a part number of the processor of the second computing device, a voltage of the processor of the second computing device, a clock speed of the processor of the second computing device, and an indication of the second language.

9. The method of claim 7, including determining when the second computing device is operating in a low power mode; wherein operating the second computing device according to the translated instructions includes operating the second computing device according to the translated instructions only when the second computing device is in the low power mode.

10. The method of claim 9, wherein operating the second computing device according to the translated instructions includes operating the second computing device without substantially increasing power consumption of the second computing device.

11. The method of claim 7, including obtaining a low power consumption of the second computing device; wherein operating the second computing device according to the translated instructions includes operating the second computing device with a power consumption at or below the low power consumption of the second computing device.

12. The method of claim 11, wherein the most efficient algorithm does not cause the second computing device to consume more power than the low power consumption of the second computing device.

13. The method of claim 7, including automatically converting cryptocurrency rewards for computing the most efficient algorithm into a fiat currency and crediting an account associated with an owner of the second computing device with the fiat currency.

14. The method of claim 7, wherein testing the operations of the second computing device with the algorithms of the list of algorithms includes simulating performance of the second computing device.

* * * * *